(12) United States Patent
Nolte (10) Patent No.: US 7,251,810 B1
(45) Date of Patent: Jul. 31, 2007

(54) MINIMAL INSTRUMENTATION FOR LOSSLESS CALL PROFILING

(75) Inventor: Barry M. Nolte, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/560,269

(22) Filed: Apr. 26, 2000

(51) Int. Cl.
G06F 9/44 (2006.01)
G06F 11/00 (2006.01)
G06F 9/45 (2006.01)

(52) U.S. Cl. .................. 717/130; 717/128; 714/35

(58) Field of Classification Search ........ 717/127–131, 717/154–158, 106–113
See application file for complete search history.

(56) References Cited

U.S. PATENT DOCUMENTS

| | | | | |
|---|---|---|---|---|
| 5,539,907 A * | 7/1996 | Srivastava et al. | ........... | 717/130 |
| 5,630,131 A * | 5/1997 | Palevich et al. | ............ | 717/108 |
| 5,652,899 A * | 7/1997 | Mays et al. | .................. | 715/512 |
| 5,732,272 A * | 3/1998 | Gochee | ........................ | 714/38 |
| 5,761,513 A * | 6/1998 | Yellin et al. | ................ | 717/127 |
| 5,812,850 A * | 9/1998 | Wimble | ....................... | 717/131 |
| 5,896,538 A * | 4/1999 | Blandy et al. | .............. | 717/127 |
| 5,918,004 A * | 6/1999 | Anderson et al. | ............. | 714/25 |
| 5,950,002 A * | 9/1999 | Hoford et al. | .............. | 717/109 |
| 5,966,539 A * | 10/1999 | Srivastava | ................... | 717/156 |
| 5,987,249 A * | 11/1999 | Grossman et al. | ........... | 717/130 |
| 6,016,466 A * | 1/2000 | Guinther et al. | ............. | 702/186 |
| 6,049,666 A * | 4/2000 | Bennett et al. | ............. | 717/130 |
| 6,077,311 A * | 6/2000 | Lichtenstein et al. | ....... | 717/128 |
| 6,088,525 A * | 7/2000 | Peri | ........................... | 717/150 |
| 6,230,314 B1 * | 5/2001 | Sweeney et al. | ............ | 717/108 |
| 6,282,701 B1 * | 8/2001 | Wygodny et al. | ........... | 702/183 |
| 6,314,558 B1 * | 11/2001 | Angel et al. | ................... | 714/35 |
| 6,332,213 B1 * | 12/2001 | Grossman et al. | ............ | 714/35 |
| 6,349,406 B1 * | 2/2002 | Levine et al. | ................ | 717/128 |
| 6,374,369 B1 * | 4/2002 | O'Donnell | ..................... | 714/38 |
| 6,397,380 B1 * | 5/2002 | Bittner et al. | ............... | 717/151 |
| 6,438,512 B1 * | 8/2002 | Miller | ........................ | 702/186 |
| 6,493,868 B1 * | 12/2002 | DaSilva et al. | ............. | 717/105 |
| 6,671,876 B1 * | 12/2003 | Podowski | .................... | 717/130 |

OTHER PUBLICATIONS

Michael Wolfe, "Partial Redundancy Elimination is not Bidirectional", Feb. 2, 1999, ACM SIGPLAN Notices, vol. 34, Issue 6, ISSN: 0362-1340, pp. 43-46.*
Aho, Sethi, and Ullman, "Compilers: Principles, Techniques, and Tools", 1986, Addison-Wesley, ISBN 0-201-10088-6, pp. 585-591.*
Thomas Ball, James R. Larus, "Optimally profiling and tracing programs", Jul. 1994, ACM Transactions on Programming Languages and Systems (TOPLAS), vol. 16 Issue 4, pp. 1319-1360□□.*
Muchnick, "Advanced Compiler Design Implementation", 1997, Morgan Kaufmann Publishers, pp. 590-591.*

* cited by examiner

*Primary Examiner*—Tuan Dam
*Assistant Examiner*—J. Derek Rutten
(74) *Attorney, Agent, or Firm*—Merchant & Gould P.C.; Ryan T. Grace (57) ABSTRACT

A method, apparatus, and software are disclosed for collecting information relating to the execution of an application for use in analyzing the performance of the application. Probes are inserted at only those points in the application that would yield non-redundant information. As a result, the impact of the information collection process on the application is reduced, improving the usefulness of the collected information.

33 Claims, 5 Drawing Sheets

```
void main()
{
    .
    .
    call Function1();      ⎯416
    _ReturnFromFunction();
    .
    .
} void Function1()
{
    .
    .
                         ⎯412
    _CallToFunction();
    jump to Function2();
}                 ⎯406 void Function2()
{
    .
    .
              ⎯410
    return;     // this returns to main(), not to Function1()
}
```

```
void main()
{
        _EnterFunction();         ⌐302
        .
        .
        .
        _CallToFunction();        ⌐304
        CalledToFunction();       ⌐306
        _ReturnFromFunction();
        .
        .
        _ExitFunction();          ⌐308
} void CalledToFunction()
{
        _EnterFunction();         ⌐310
        .
        .
        .
        _ExitFunction();          ⌐312
}
```

314 brackets the main() body; 316 brackets the CalledToFunction() body.

FIG. 3

```
void main()
{
        .
        .
        .
        call Function1();      ⌐416
        _ReturnFromFunction();                  ⎫
                                         ⎬ 414  ⎬ 402
        .                                ⎭
        .
        .
} void Function1()
{
        .
        .
        .                      ⌐412              ⎬ 404
        _CallToFunction();
        jump to Function2();
}                              ⌐406 void Function2()
{
        .
        .
        .                                                                ⎬ 408
        ⌐410
        return;      // this returns to main(), not to Function1()
}
```

*FIG. 4*

```
                    ┌─510
void main()
{
        _EnterFunction();
        try
        {
                .
                .
                .     ┌─506
                    throw();
                .
                .
                .
        }   ┌─502
        catch
        {         ┌─512
                _EnterFunction();
                .
                .
                .     ┌─514
                _ExitFunction();
        }
        _ExitFunction();
}
```

*FIG. 5*

MINIMAL INSTRUMENTATION FOR LOSSLESS CALL PROFILING

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2000, Microsoft, Inc.

TECHNICAL FIELD OF THE INVENTION

The present invention pertains generally to development of computer software applications, and more particularly to performance analysis of such applications.

BACKGROUND OF THE INVENTION

Computer software applications typically consist of many modules, known as functions, which work together to perform desired tasks. A significant concern in software development is operational speed, which is largely dependent on the performance of the individual functions making up the application. Thus, an important component of application development is monitoring application performance.

To provide useful information, performance measurement should, to the extent possible, avoid interfering with the normal operation of the application. Because performance measurement involves collecting data in circumstances under which data would not ordinarily be collected, performance measurement necessarily affects the normal operation of the application to a certain extent. Certain factors contribute to this effect. For example, inserting data collection code in an application makes the application larger, which slows operation down somewhat. This decrease in performance is attributable to the increase in the amount of code that must be both loaded into the system's memory and executed. In addition, adding data collection code increases the amount of time other operations take due to the execution of the data collection code. As a result, the time relationships between the other activities within the application and within the system are affected. Data collection also affects application performance as a result of input/output (I/O) bandwidth considerations. Specifically, when data is collected, it must be stored, for example, in physical memory, on a disk, or on a networked device. Storing data consumes significant time due to the relatively slow process of outputting data to the storage device. This burden is especially considerable when large amounts of data are collected. While the burden can be reduced by adding a dedicated I/O device, such as a disk drive, device contention may still arise at the system level.

SUMMARY OF THE INVENTION

According to various example implementations of the invention, there is provided a process for collecting information relating to the execution of an application for use in performance analysis. Probes are inserted at only those points in the application that would yield non-redundant information. By avoiding the collection of redundant information, the effect of the information collection process on the application is reduced. Additionally, performance of the data analysis process is improved due to the reduction of cases in which it must be decided whether data is redundant, and also due to the reduction of work involved in discarding redundant data. The accuracy and usefulness of the collected information are thus improved.

In a particular implementation, probe locations are determined at which collecting data relating to the execution of the application would produce non-redundant information. Probes are then inserted only at these locations. In general, these locations include the entry and exit points of the functions making up the application. Other particular implementations of the present invention relate to, for example, exceptional cases in which probes are inserted at other locations in addition to entry and exit points.

In another particular implementation, the entry and exit points of functions constituting at least a portion of the application are determined. Also determined are probe locations in the application at which collecting data relating to the execution of the application would produce non-redundant information. These probe locations include at least the determined entry and exit points. Probes are inserted only at the determined probe locations in the application. These probes are then used to collect the information relating to the execution of the application. The collected information is then analyzed.

Still other implementations include computer-readable media and apparatuses for performing these methods. The above summary of the present invention is not intended to describe every implementation of the present invention. The figures and the detailed description that follow more particularly exemplify these implementations.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

HARDWARE AND OPERATING ENVIRONMENT

Figure 1:
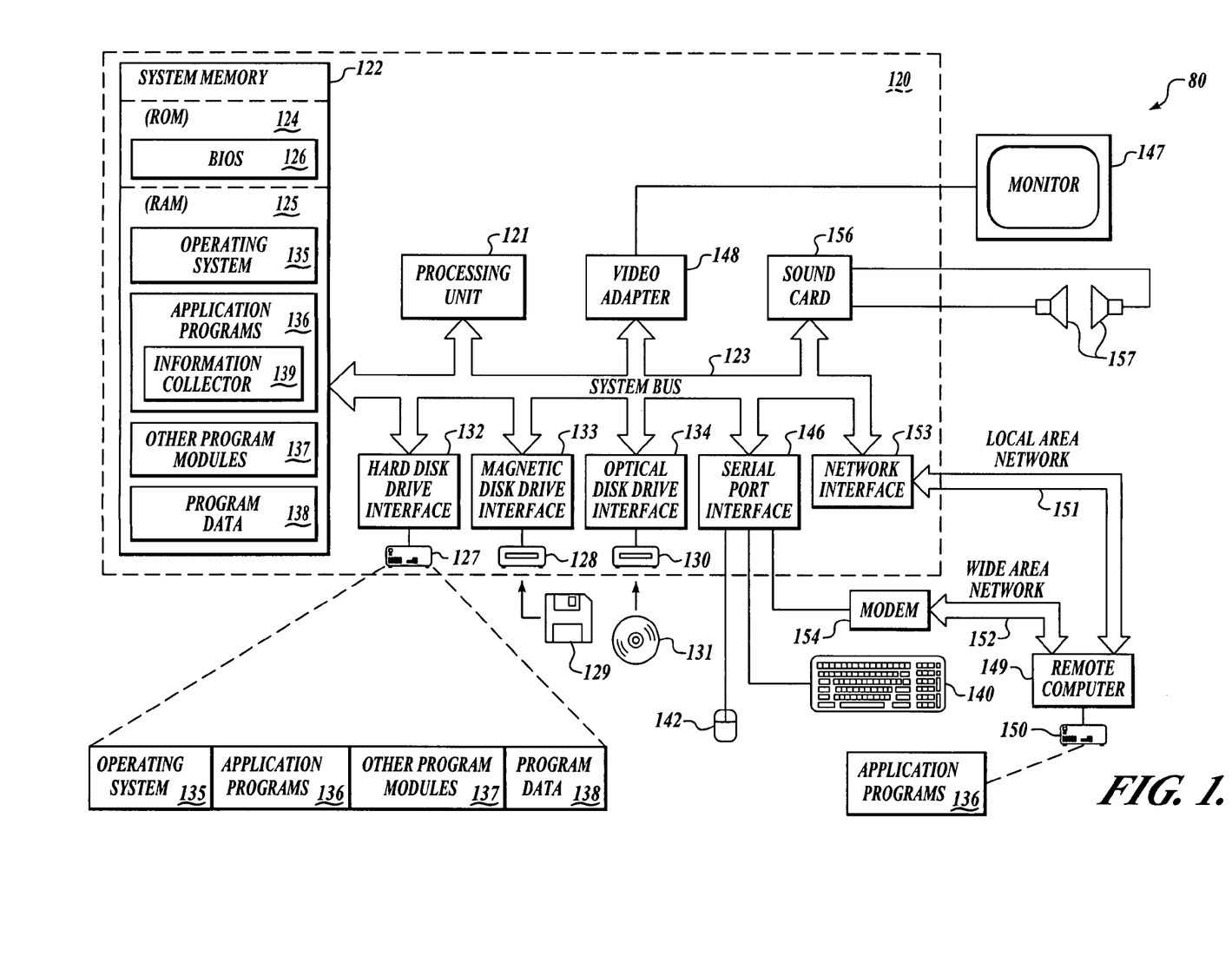
FIG. 1 illustrates a simplified overview of an example embodiment of a computing environment for the present invention.

FIG. 1 illustrates a hardware and operating environment in conjunction with which embodiments of the invention may be practiced. The description of FIG. 1 is intended to provide a brief, general description of suitable computer hardware and a suitable computing environment with which the invention may be implemented. Although not required, the invention is described in the general context of computer-executable instructions, such as program modules, being executed by a computer, such as a personal computer (PC). This is one embodiment of many different computer configurations, some including specialized hardware circuits to analyze performance, that may be used to implement the present invention. Generally, program modules include routines, programs, objects, components, data structures, etc. that perform particular tasks or implement particular abstract data types.

Moreover, those skilled in the art will appreciate that the invention may be practiced with other computer-system configurations, including hand-held devices, multiprocessor systems, microprocessor-based or programmable consumer electronics, network personal computers ("PCs"), minicomputers, mainframe computers, and the like. The invention may also be practiced in distributed computing environments where tasks are performed by remote processing devices linked through a communications network. In a distributed computing environment, program modules may be located in both local and remote memory storage devices.

FIG. 1 shows a computer arrangement implemented as a general-purpose computing or information-handling system 80. This embodiment includes a general purpose computing device such as personal computer (PC) 120, that includes processing unit 121, a system memory 122, and a system bus 123 that operatively couples the system memory 122 and other system components to processing unit 121. There may be only one or there may be more than one processing unit 121, such that the processor computer 120 comprises a single central-processing unit (CPU), or a plurality of processing units, commonly referred to as a parallel processing environment. The computer 120 may be a conventional computer, a distributed computer, or any other type of computer; the invention is not so limited.

In other embodiments other configurations are used in PC 120. System bus 123 may be any of several types, including a memory bus or memory controller, a peripheral bus, and a local bus, and may use any of a variety of bus architectures. The system memory 122 may also be referred to as simply the memory, and it includes read-only memory (ROM) 124 and random-access memory (RAM) 125. A basic input/output system (BIOS) 126, stored in ROM 124, contains the basic routines that transfer information between components of personal computer 120. BIOS 126 also contains start-up routines for the system.

Personal computer 120 further includes hard disk drive 127 having one or more magnetic hard disks (not shown) onto which data is stored and retrieved for reading from and writing to hard-disk-drive interface 132, magnetic disk drive 128 for reading from and writing to a removable magnetic disk 129, and optical disk drive 130 for reading from and/or writing to a removable optical disk 131 such as a CD-ROM, DVD or other optical medium. Hard disk drive 127, magnetic disk drive 128, and optical disk drive 130 are connected to system bus 123 by a hard-disk drive interface 132, a magnetic-disk drive interface 133, and an optical-drive interface 134, respectively. The drives 127, 128, and 130 and their associated computer-readable media 129, 131 provide nonvolatile storage of computer-readable instructions, data structures, program modules and other data for personal computer 120. Although the exemplary environment described herein employs a hard disk, a removable magnetic disk 129 and a removable optical disk 131, those skilled in the art will appreciate that other types of computer-readable media which can store data accessible by a computer may also be used in the exemplary operating environment. Such media may include magnetic tape cassettes, flash-memory cards, digital video disks (DVD), Bernoulli cartridges, RAMs, ROMs, and the like.

In various embodiments, program modules are stored on a hard disk drive 127, magnetic disk 129, optical disk 131, ROM 124 and/or RAM 125 and may be moved among these devices, e.g., from hard disk drive 127 to RAM 125. Program modules include operating system 135, one or more application programs 136, other program modules 137, and/or program data 138. An information collector 139, which is described in detail below with reference to FIGS. 2-5, is implemented within application programs 136. A user may enter commands and information into personal computer 120 through input devices such as a keyboard 140 and a pointing device 142. Other input devices (not shown) for various embodiments include one or more devices selected from a microphone joystick, game pad, satellite dish, scanner, or the like. These and other input devices are often connected to a processing unit 121 through a serial-port interface 146 coupled to system bus 123, but in other embodiments they are connected through other interfaces not shown in FIG. 1, such as a parallel port, a game port, or a universal serial bus (USB) interface. A monitor 147 or other display device also connects to system bus 123 via an interface such as a video adapter 148. In some embodiments, one or more speakers 157 or other audio output transducers are driven by sound adapter 156 connected to system bus 123. In some embodiments, in addition to the monitor 147, a system 180 includes other peripheral output devices (not shown) such as a printer or the like.

In some embodiments, personal computer 120 operates in a networked environment using logical connections to one or more remote computers such as remote computer 149. Remote computer 149 may be another personal computer, a server, a router, a network PC, a peer device, or other common network node. Remote computer 149 typically includes many or all of the components described above in connection with personal computer 120; however, only a storage device 150 is illustrated in FIG. 1. The logical connections depicted in FIG. 1 include local-area network (LAN) 151 and a wide-area network (WAN) 152, both of which are shown connecting PC 120 to remote computer 149; typical embodiments would only include one or the other. Such networking environments are commonplace in offices, enterprise-wide computer networks, Intranets and the Internet.

When placed in a LAN networking environment, PC 120 connects to local network 151 through a network interface or adapter 153. When used in a WAN networking environment such as the Internet, PC 120 typically includes modem 154 or other means for establishing communications over network 152. Modem 154 may be internal or external to PC 120 and connects to system bus 123 via serial-port interface 146 in the embodiment shown. In a networked environment, program modules depicted as residing within PC 120 or portions thereof may be stored in remote-storage device 150. Of course, the network connections shown are illustrative, and other means of establishing a communications link between the computers may be substituted.

Software may be designed using many different methods, including object-oriented programming methods. C++ and Java are two examples of common object-oriented computer programming languages that provide functionality associated with object-oriented programming. Object-oriented programming methods provide a means to encapsulate data members (variables) and member functions (methods) that operate on that data into a single entity called a class. Object-oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in some embodiments.

An interface is a group of related functions that are organized into a named unit. Some identifier may uniquely identify each interface. Interfaces have no instantiation; that is, an interface is a definition only without the executable code needed to implement the methods that are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object-oriented programming environment.

EXAMPLE EMBODIMENTS OF THE INVENTION

According to one example embodiment of the present invention, probes are intelligently inserted in applications to collect enough information to perform full call attribution, i.e., to measure the amount of time any function takes from start to finish, while avoiding collecting redundant information that is not needed to perform full call attribution. By avoiding the collection of unnecessary information, the various implementations of the present invention reduce the effect of the instrumentation process on the application being instrumented. As a result, normal operations are disrupted less significantly, allowing for greater accuracy in measuring application performance. Instrumentation can be performed at compilation time, as a post link step, or even while the application is running. Furthermore, the techniques described herein are language-independent and can be used with all procedural languages, e.g., C, C++, Java, Pascal, Fortran, BASIC, Cobol, etc.

In particular, the application whose performance is to be measured is instrumented at logical points that can be associated with the original source code that was used to generate the application, while maintaining a granularity that does not generate data that is not needed to perform full call attribution. In most cases, probes are inserted at the entry and exit points of all discrete functions in the application. Under certain circumstances, however, probes are also placed at other strategic points in the application. Intelligent placement of these probes ensures that enough information is collected to perform full call attribution, while avoiding unduly interfering with the normal operation of the application by avoiding the collection of redundant information.

According to a particular implementation of the present invention, various types of probes are used to monitor the performance of an application. One type labeled, for example, _EnterFunction, is placed at the entry point of a function and collects the address of the function being entered and the current stack pointer, as well as a time stamp that indicates when the function was entered. Another type of probe, an _ExitFunction probe, is placed at an exit point of a function and collects data similar to that collected by the _ EnterFunction probe. In particular, the _ExitFunction probe collects the address of the function being exited, the current stack pointer, and a time stamp that indicates when the function was exited. Yet another type of probe, a _ CallToFunction probe, is placed at certain points in the application immediately before program flow changes from one function to another. This type of probe collects the address of the function from which the call originated, the address of the function being called, the current stack pointer, and a time stamp indicating when the change in program flow occurred. A fourth type of probe, a _ReturnFromFunction probe, is placed at the return point of a program flow change. The _ReturnFromFunction probe collects the address of the function to which program flow returns, the current stack pointer, and a time stamp indicating when program flow returned to the previous function.

For each of these types of probes, the address of functions is collected so that, when performance is analyzed, time can be accurately attributed to the correct functions. The probes also collect the current stack pointer to facilitate correct attribution of recursive function calls. That is, collecting the current stack pointer allows the correct attribution of time to the correct instance of a function in recursive cases. In addition, attribution is facilitated in certain cases in which program flow is changed in non-traditional ways.

Figure 2:
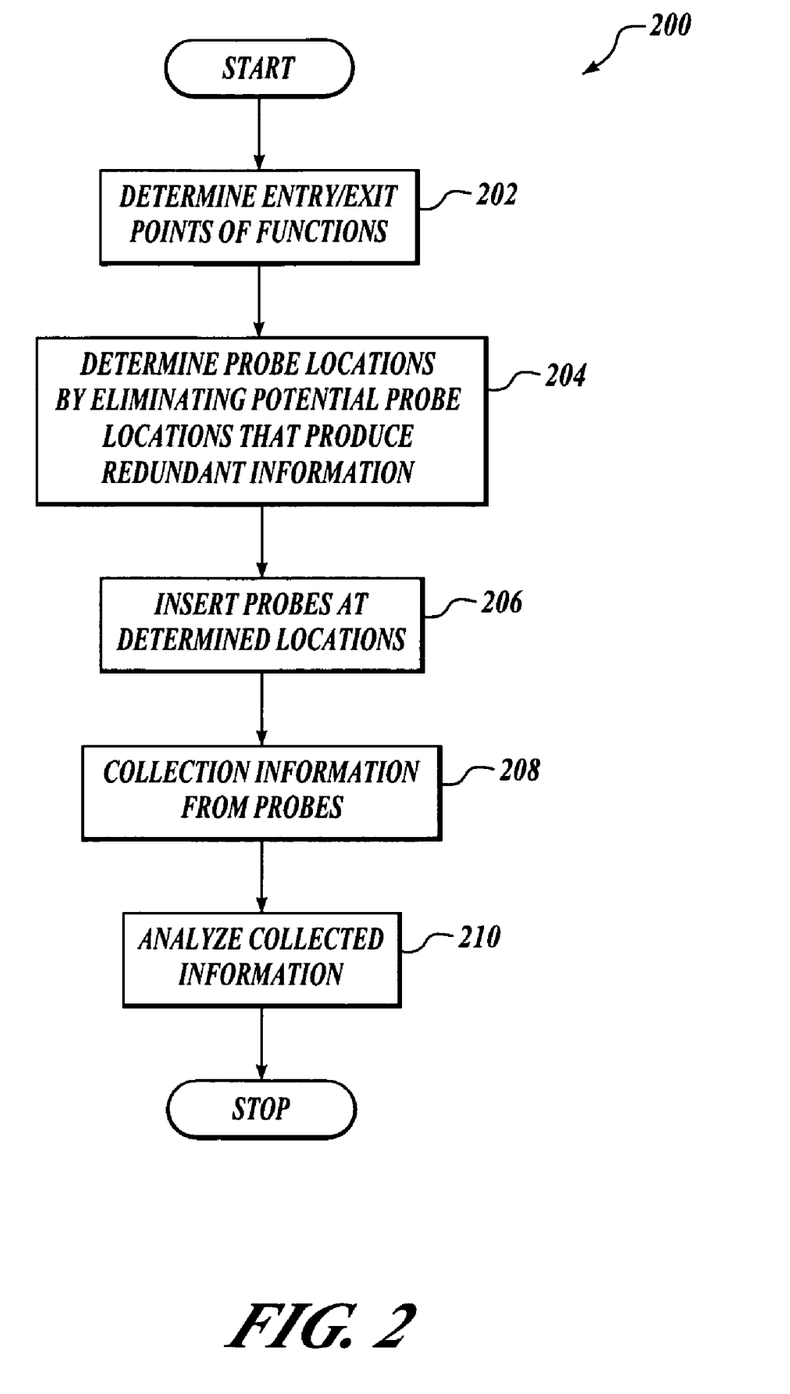
FIG. 2 is a flow chart illustrating an example method for analyzing the performance of an application, according to an embodiment of the present invention.

Referring again to the drawings, FIG. 2 depicts an example method 200 for analyzing application performance, according to a particular embodiment of the present invention. At a block 202, the functions are analyzed to determine their entry and exit points. In particular, a function's entry point is the first statement in the function. Its exit points typically include the last statement in the function, as well as any points within the function at which other functions are called.

Each of these entry and exit points is a potential location at which a probe might be inserted to collect data relevant to full call attribution. While full call attribution can be performed by inserting probes at all of these locations, it is usually not necessary to collect data at all of these points. Indeed, omitting instrumentation at certain non-essential points reduces the effect of the performance analysis process on the application whose performance is being analyzed, thereby improving accuracy. Accordingly, at a block 204, the entry and exit points of the function are analyzed to determine which points, if instrumented with a probe, would yield non-redundant information, i.e., which points should be instrumented.

Figure 3:
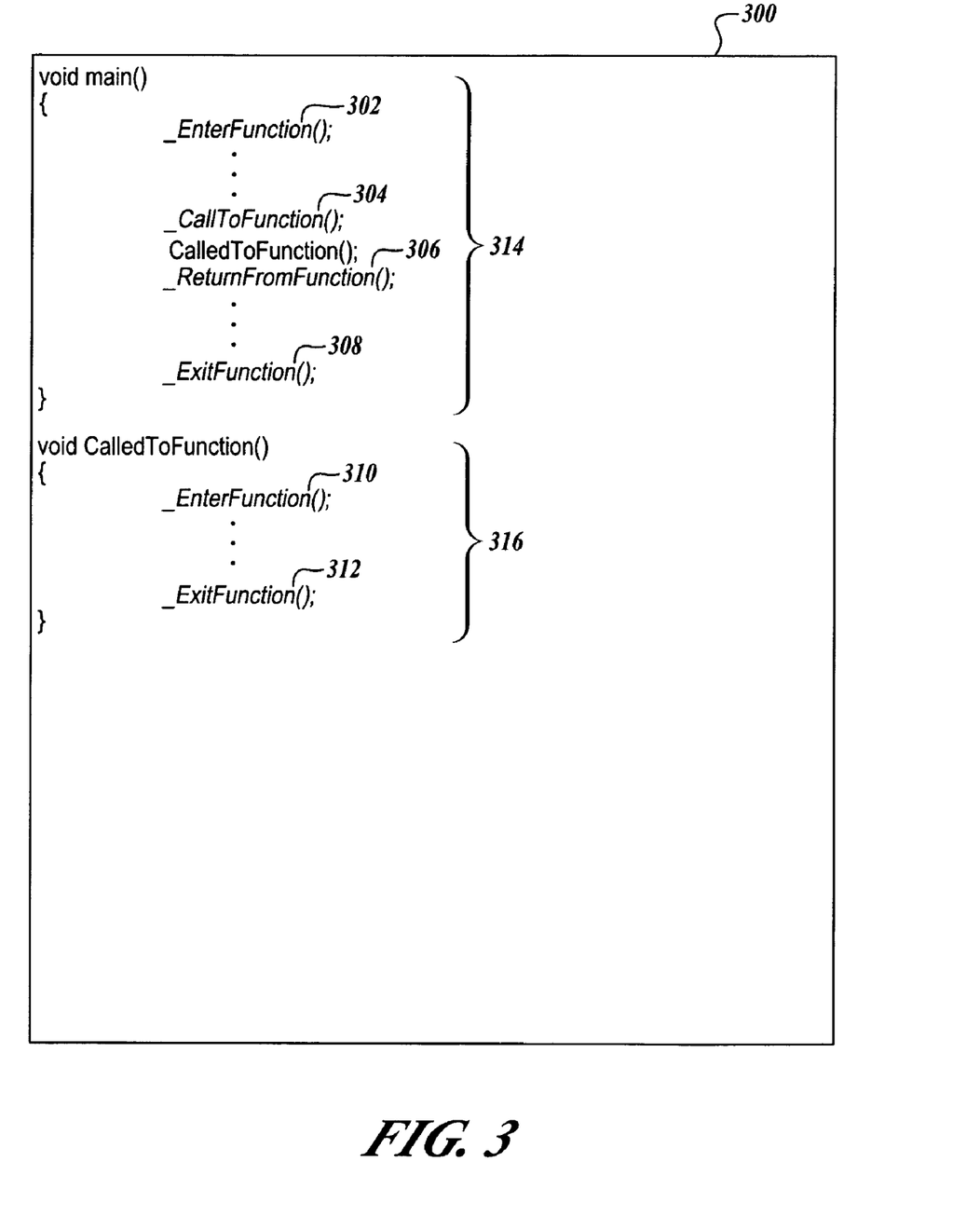
FIG. 3 depicts a portion of an application with potential probe locations.

FIG. 3 depicts a portion 300 of an application and its potential probe locations 302, 304, 306, 308, 310, and 312. For purposes of clarity, the potential probe locations are depicted in italic type in FIG. 3. As can be seen in FIG. 3, potential locations for the _EnterFunction probes 302 and 310 occur at the beginnings of a main function 314 and of a CalledToFunction function 316. Similarly, potential locations for the _ExitFunction probes 308 and 312 occur at the ends of the main function 314 and of the CalledToFunction function 316.

Some of the probes can be omitted so as to collect sufficient information to perform full call attribution without collecting redundant information. At the block 204 of FIG. 2, the system determines which probes can be omitted. In the specific example shown in FIG. 3, the _CallToFunction and _ ReturnFromFunction probes provide redundant information. These probes are redundant because they would supply almost exactly the same information at almost the same time as other probes. For example, the _CallToFunction probe 304 in the main function 314 would supply almost the same information as the _EnterFunction probe 310 in the function 316 at nearly the same time, with only a slight time difference attributable to overhead for the probe itself. Similarly, the _ReturnFromFunction probe 306 in the main function 314 would supply almost the same information as the _ExitFunction probe 312 in the function 316 at nearly the same time. Thus, because the _CallToFunction and _ReturnFromFunction probes are redundant in this example, the potential probe locations 304 and 306 need not be instrumented, and are eliminated from consideration by the system at the block 204 of FIG. 2. It is desirable to eliminate the _CallToFunction and _ReturnFromFunction probes because there are typically more locations that call to functions than there are functions themselves. Thus, eliminating these probe pairs removes a larger portion of the total instrumentation, while ensuring that enough information to perform full call attribution is collected.

While this strategy increases efficiency in most cases, it does not work for all cases. In particular, eliminating these probe pairs only works in the case of direct calls to functions within the current module. Thus, while instrumentation of calls within the current module can be eliminated from the list of instrumentation points, instrumentation of calls outside of the current module cannot. Eliminating these probes would cause insufficient information for full call attribution to be gathered, since there is no guarantee that other modules will be instrumented. Time can be incorrectly attributed as a result. For example, referring again to FIG. 3, if the function 316 were located in a different module from the main function 314, eliminating the probes at locations 304 and 306 would cause time spent in the function 316 to be incorrectly attributed to the main function 314. Thus, as a general rule, calls outside the current module are instrumented both before and after the call is performed, e.g., if the main function 314 and the function 316 were located in different modules, _CallToFunction and _ReturnFromFunction probes would be inserted at locations 304 and 306, respectively.

Figure 4:
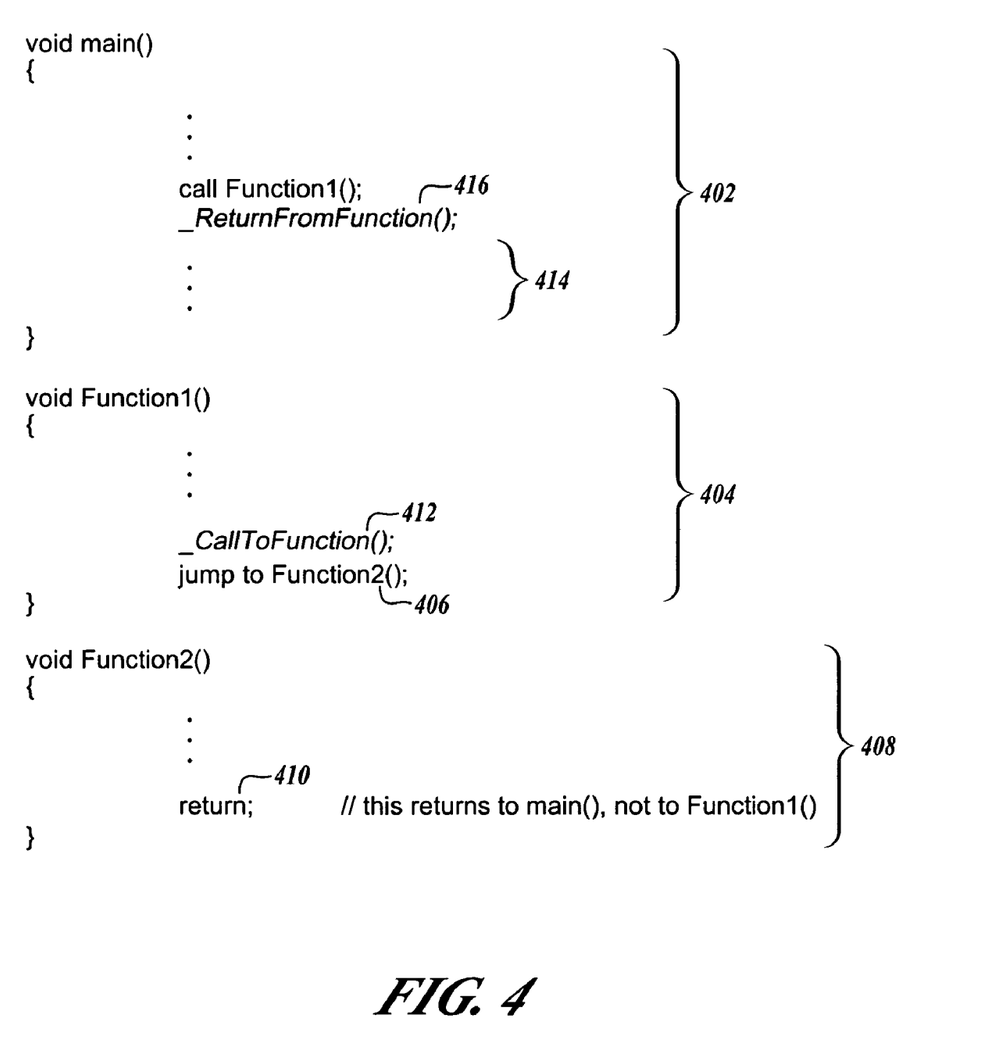
FIG. 4 depicts an example instrumentation scheme according to one operational example of an embodiment of the present invention.

Another situation in which the normal strategy of instrumenting only the entry and exit points of functions produces potentially inaccurate results occurs in what is known as a tail merge. A tail merge is an optimization made either by a compiler or by the programmer at the machine instruction level that eliminates calls to functions by instead jumping to the next function, then having a single return statement return out of multiple functions. FIG. 4 depicts an example of a tail merge situation. In FIG. 4, a main function 402 calls a Function1 function 404. At a point 406, the function 404 in turn calls a Function2 function 408. At the end of this function, a return statement 410 is encountered. This return statement 410, however, returns to the main function 402. This change in flow is contrary to the expected sequence of events, in which the return statement 410 would return to the function 404, which called the function 408. Normally, another return statement would redirect execution from the function 404 back to the main function 402, which called the function 404. Because a tail merge functions similarly to a call/return pair, it should be instrumented. A _CallToFunction probe 412 is inserted before the jump at the point 406, treating the jump as a call to the function 408. Since execution does not return to the point 406 after the jump, however, a _ReturnFromFunction probe placed after the jump would be superfluous.

This departure from the normal sequence of events is a potential source of ambiguity in attributing time to the correct functions. Specifically, an issue arises as to the proper attribution of a time period 414 occurring after the point 406 and before the end of the main function 402. Typically, an _ExitFunction probe would precede the return statement 410 and would indicate that program flow is exiting the function 408. This probe, however, does not convey any information as to where program flow continues after exiting the function 408. Without additional information, this time is likely to be erroneously attributed to the function 404 because the function 408 was called by the function 404, but no end point was available within the function 404 with which to properly attribute time. The time period 414, however, should be attributed to the main function 402, which is where execution proceeds after the jump. This ambiguity can be resolved in a number of ways. One way is to flag the _CallToFunction probe 412 as calling a function that has a tail merge. Another way is to insert a _ ReturnFromFunction probe 416 at the point to which execution proceeds after the tail merge. Inserting the _ReturnFromFunction probe 416 at this location clarifies the destination of the return from the function 408 when the function trace is processed.

Figure 5:
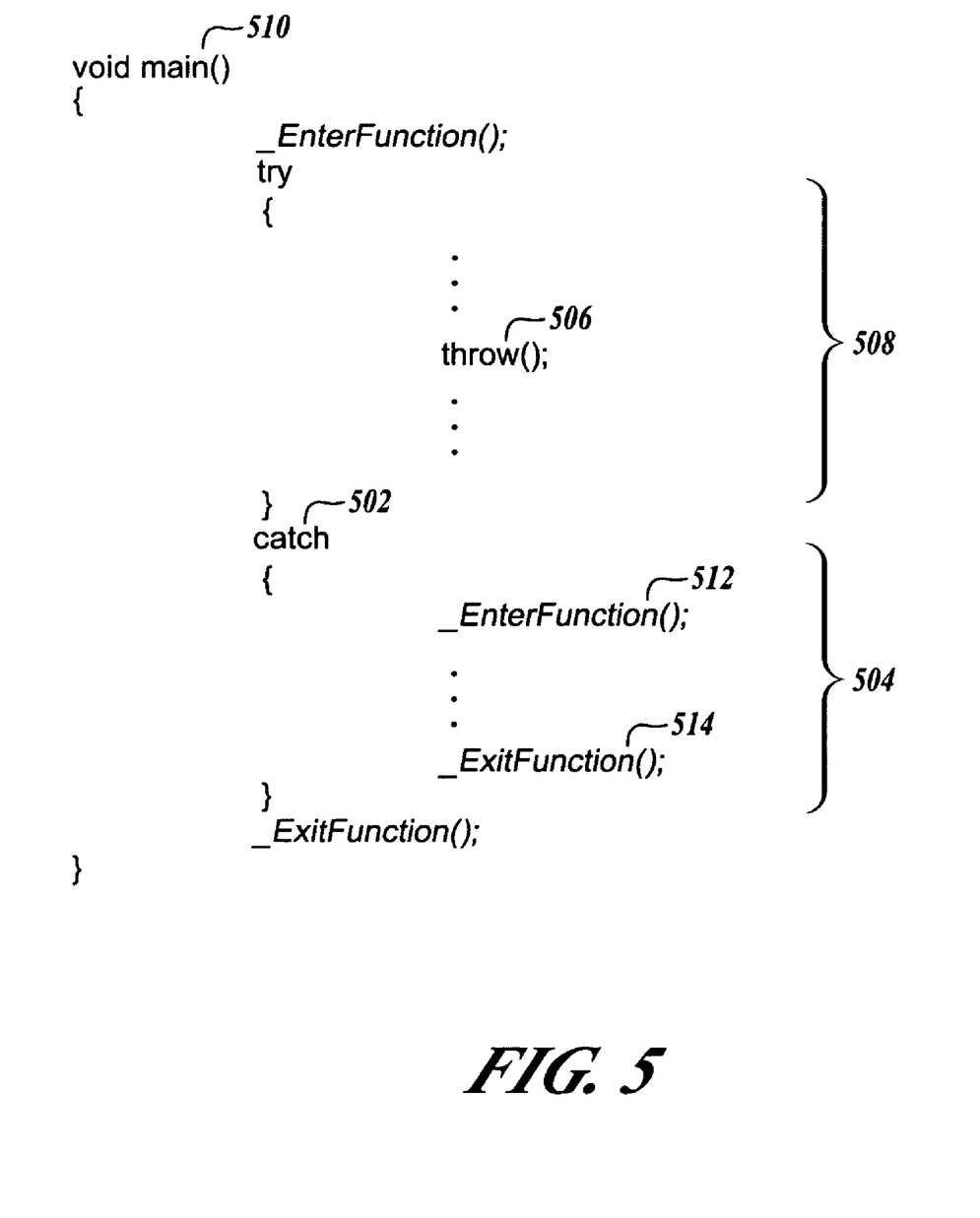
FIG. 5 depicts another example instrumentation scheme according to another operational example of an embodiment of the present invention.

Another scenario in which inserting probes at only the entry and exit points of functions does not provide sufficient information to perform full call attribution arises in connection with blocks of code known as catch blocks and in connection with non-local go-to's. Both of these situations arise most commonly in connection with error handling mechanisms and can be instrumented in the same manner. FIG. 5 illustrates a catch block and its instrumentation. In the example depicted in FIG. 5, a block of code attached to a catch statement 502, known as a catch block 502, is not called. Rather, execution jumps to the catch block 502 in the case of an exception throw 506 in a try block 508. Execution of the catch block 502 is neither a function call nor a tail merge. The catch block 502, however, can be treated as a function for purposes of performance analysis. In one implementation, the catch block 502 is treated as a reentrant call to the function that contains the catch block 502, i.e., a main function 510 in this case. Thus, in this example, an _EnterFunction probe 512 and an _ExitFunction probe 514 are inserted in the catch block 502 at the locations illustrated in FIG. 5, with the function being entered and exited denoted as the main function 510.

Some other error handling mechanisms produce non-local go-to's by causing execution to jump to other blocks of code. For example, in the C programming language, the setjmp/longjmp facilities produce non-local go-to's. These blocks of code can be instrumented in the same manner as catch blocks, as discussed above in connection with FIG. 5.

Another situation that is noteworthy is that raised by inlined functions, which are functions marked as "inlined" by the developer as a directive to the compiler. A function is requested to be inlined when the developer surmises that the cost (in terms of the code generated) associated with calling, executing and returning from the function is greater than the cost associated with simply executing the code "inline" within the calling function. The compiler may or may not fulfill this request. If the request is fulfilled, the inlined function will become part of another function and will not have entry and exit points associated with it. Thus, the inlined function is not instrumented. If, on the other hand, the request is not fulfilled, then the function that was intended to be inlined will still have entry and exit points, which are instrumented with _EnterFunction and _ExitFunction probes, as appropriate. These probes are useful in that the developer does not expect the function to exist as a distinct entity. If time is attributed to a function that the developer expects to be inlined, then the developer can investigate the circumstances precluding the inlining of the function and can make changes to enable the function to be inlined.

Referring again to FIG. 2, after the non-redundant probe locations are determined in connection with the block 204, execution proceeds to a block 206, at which the appropriate probes are inserted in the application at only the non-redundant probe locations. Later, when the application is executed, the probes are used at a block 208 to collect information that includes, but is not necessarily limited to, information regarding execution of the probes' associated functions. In particular, this information may include, for example, the address of the function being entered or exited, the address from which another function is being called, and/or the address of a function being called. The collected information may also include a stack pointer to facilitate tracing of previous system activity, as well as a time stamp indicating when a function was entered or exited, as discussed above. After this information is collected, it is analyzed at a block 210 to determine how time should be attributed among the various functions making up the application.

By eliminating those probes that would produce redundant information, the various implementations of the present invention reduce the amount of data collection activity performed while analyzing the performance of an application, thereby reducing the extent to which the analyzed application's operation is distorted. As a result, the accuracy of the profiling process is improved.

While the embodiments of the invention have been described with specific focus on their embodiment in a software implementation, the invention as described above is not limited to software embodiments. For example, the invention may be implemented in whole or in part in hardware, firmware, software, or any combination thereof. The software of the invention may be embodied in various forms such as a computer program encoded in a machine-readable medium, such as a CD-ROM, magnetic medium, ROM or RAM, or in an electronic signal. Further, as used in the claims herein, the term "module" shall mean any hardware or software component, or any combination thereof.

What is claimed is:

1. A computer-implemented method for collecting information relating to execution of an application including at least one tail merged portion, the method being executed on a computer, the method comprising:
   determining a set of probe locations in the application, wherein determining a set of probe locations includes:
      identifying a probe location at a beginning of a calling function,
      identifying a probe location at an end of the calling function,
      identifying a probe location at a beginning of a first called function,
      identifying a probe location at an end of the first called function,
      identifying a probe location in the calling function at the beginning of a call to the first function,
      identifying a probe location in the calling function at the end of the call to the first function,
      identifying a probe location prior to a jump to a second function,
      identifying a probe location after the jump to the second function, and
      eliminating the probe location at the end of the first called function and eliminating the probe location after the jump to the second function when the first called function includes the jump to the second function and when the second function includes a return to the calling function;
   inserting probes in the identified locations that are not eliminated; and
   collecting non-redundant information relating to the execution of the application using the inserted probes.

2. The method of claim 1, wherein a first probe is inserted and configured to collect an address of the first called function, an address of the second function, a first stack pointer, and a first time indicator, and further wherein a second probe is inserted and configured to collect the address of the second function, a second stack pointer, and a second time indicator.

3. The method of claim 1, wherein a first probe is inserted and configured to collect an address of the calling function, an address of the first called function, a first stack pointer, and a first time indicator, and further wherein a second probe is inserted and configured to collect the address of the first called function, a second stack pointer, and a second time indicator.

4. The method of claim 1, further comprising:
   identifying a block of code to which execution of the application is directed upon occurrence of an error; and
   identifying a first probe location at a beginning of the identified block of code and a second probe location at an end of the identified block of code.

5. The method of claim 4, wherein a first probe is inserted in the first probe location to collect an address of the block of code, a first stack pointer, and a first time indicator, and a second probe is inserted in the second probe location to collect the address of the block of code, a second stack pointer, and a second time indicator.

6. The method of claim 1, further comprising inserting probes in the probe locations that were not eliminated to collect the information relating to the execution of the application.

7. The method of claim 6, further comprising analyzing the collected information.

8. A computer-readable storage medium having an application including computer-executable instructions including at least one tail merged portion, the computer-executable instructions comprising:
   determining a set of probe locations in the application, wherein determining a set of probe locations includes:
      identifying a probe location at a beginning of a calling function,
      identifying a probe location at an end of the calling function,
      identifying a probe location at a beginning of a first called function,
      identifying a probe location at an end of the first called function,
      identifying a probe location in the calling function at the beginning of a call to the first function,
      identifying a probe location in the calling function at the end of the call to the first function,
      identifying a probe location prior to a jump to a second function,
      identifying a probe location after the jump to the second function, and
      eliminating the probe location at the end of the first called function and eliminating the probe location after the jump to the second function when the first called function includes the jump to the second function and when the second function includes a
return to the calling function;
inserting probes in the identified locations that are not
eliminated; and
collecting non-redundant information relating to the
execution of the application using the inserted probes.

9. The computer-readable storage medium of claim 8, wherein a first probe is configured to collect an address of the first called function, an address of the second function, a first stack pointer, and a first time indicator, and further wherein a second probe is configured to collect the address of the second function, a second stack pointer, and a second time indicator.

10. The computer-readable storage medium of claim 8, wherein a first probe is configured to collect an address of the calling function, an address of the first called function, a first stack pointer, and a first time indicator, and further wherein a second probe is configured to collect the address of the first called function, a second stack pointer, and a second time indicator.

11. The computer-readable storage medium of claim 8, further comprising:
identifying a block of code to which execution of the application is directed upon occurrence of an error; and
identifying a first probe at a beginning of the identified block of code and a second probe at an end of the identified block of code,
wherein the first probe is configured to collect an address of the block of code, a first stack pointer, and a first time indicator, and the second probe is configured to collect the address of the block of code, a second stack pointer, and a second time indicator.

12. A computer-implemented method for collecting information relating to execution of an application including at least one tail merged portion, the method being executed on a computer, the method comprising:
determining a set of probe locations in the application, wherein determining a set of probe locations includes:
identifying a probe location at a beginning of a calling function,
identifying a probe location at an end of the calling function,
identifying a probe location at a beginning of a first called function,
identifying a probe location at an end of the first called function,
identifying a probe location in the calling function at the beginning of a call to the first called function,
identifying a probe location in the calling function at the end of the call to the first called function,
identifying a probe location prior to a jump to a second function,
identifying a probe location after the jump to the second function, and
determining that the first called function is an internal called function,
eliminating the probe location in the calling function at the beginning of the call to the first called function;
eliminating the probe location at the end of the first called function and eliminating the probe location after the jump to the second function when the first called function includes the jump to the second function and when the second function includes a return to the calling function;
inserting probes in the identified locations that are not eliminated; and
collecting non-redundant information relating to the execution of the application using the inserted probes.

13. The method of claim 12, wherein a first probe is inserted and configured to collect an address of the first called function, and a first stack pointer, and a first time indicator.

14. The method of claim 12, wherein a first probe is inserted and configured to collect an address of the calling function, an address of the first called function, a first stack pointer, and a first time indicator, and further wherein a second probe is inserted and configured to collect the address of the first called function, a second stack pointer, and a second time indicator.

15. The method of claim 12, further comprising:
identifying a block of code to which execution of the application is directed upon occurrence of an error; and
identifying a first probe location at a beginning of the identified block of code and a second probe location at an end of the identified block of code.

16. The method of claim 15, wherein a first probe is inserted and configured to collect an address of the block of code, a first stack pointer, and a first time indicator, and a second probe is inserted and configured to collect the address of the block of code, a second stack pointer, and a second time indicator.

17. The method of claim 12, further comprising: inserting probes in the probe locations that are not eliminated and using the inserted probes to collect the information relating to the execution of the application.

18. The method of claim 17, further comprising: analyzing the collected information.

19. A computer-readable storage medium having an application including computer-executable instructions including at least one tail merged portion, the computer-executable instructions comprising:
determining a set of probe locations in the application, wherein determining a set of probe locations includes:
identifying a probe location at a beginning of a calling function,
identifying a probe location at an end of the calling function,
identifying a probe location at a beginning of a first called function,
identifying a probe location at an end of the first called function,
identifying a probe location in the calling function at the beginning of a call to the first called function,
identifying a probe location in the calling function at the end of the call to the first called function,
identifying a probe location prior to a jump to a second function,
identifying a probe location after the jump to the second function, and
determining that the first called function is an internal called function,
eliminating the probe location in the calling function at the beginning of the call to the first called function;
eliminating the probe location at the end of the first called function and eliminating the probe location after the jump to the second function when the first called function includes the jump to the second function and when the second function includes a return to the calling function;
inserting probes in the identified locations that are not eliminated; and
collecting non-redundant information relating to the execution of the application using the inserted probes.

20. The computer-readable medium of claim 19, wherein a first probe is configured to collect an address of the first called function, a first stack pointer, and a first time indicator.

21. The computer-readable medium of claim 19, wherein a first probe is configured to collect an address of the calling function, an address of the first called function, a first stack pointer, and a first time indicator, and further wherein a second probe is configured to collect the address of the first called function, a second stack pointer, and a second time indicator.

22. The computer-readable medium of claim 19, having further computer-executable instructions for:
identifying a block of code to which execution of the application is directed upon occurrence of an error; and
inserting a first probe at a beginning of the identified block of code and a second probe at an end of the identified block of code,
wherein the first probe is configured to collect an address of the block of code, a first stack pointer, and a first time indicator, and the second probe is configured to collect the address of the block of code, a second stack pointer, and a second time indicator.

23. A computer system comprising a processor that is arranged to execute computer-executable instructions including at least one tail merged portion, the computer-executable instructions comprising:
determining a set of probe locations in the application, wherein determining a set of probe locations includes:
identifying a probe location at a beginning of a calling function,
identifying a probe location at an end of the calling function,
identifying a probe location at a beginning of a first called function,
identifying a probe location at an end of the first called function,
identifying a probe location in the calling function at the beginning of a call to the first function,
identifying a probe location in the calling function at the end of the call to the first function,
identifying a probe location prior to a jump to a second function,
identifying a probe location after the jump to the second function, and
eliminating the probe location at the end of the first called function and eliminating the probe location after the jump to the second function when the first called function includes the jump to the second function and when the second function includes a return to the calling function;
inserting probes in the identified locations that are not eliminated; and
collecting non-redundant information relating to the execution of the application using the inserted probes.

24. The computer system of claim 23, wherein a first probe is inserted and configured to collect an address of the first called function, an address of the second function, a first stack pointer, and a first time indicator, and further wherein a second probe is inserted and configured to collect the address of the second function, a second stack pointer, and a second time indicator.

25. The computer system of claim 23, wherein a first probe is inserted and configured to collect an address of the calling function, an address of the first called function, a first stack pointer, and a first time indicator, and further wherein a second probe is inserted and configured to collect the address of the first called function, a second stack pointer, and a second time indicator.

26. The computer system of claim 23, further configured to execute computer-executable instructions for:
identifying a block of code to which execution of the application is directed upon occurrence of an error; and
identifying a first probe location at a beginning of the identified block of code and a second probe location at an end of the identified block of code.

27. The computer system of claim 26, wherein a first probe is inserted in the first probe location to collect an address of the block of code, a first stack pointer, and a first time indicator, and a second probe is inserted in the second probe location to collect the address of the block of code, a second stack pointer, and a second time indicator.

28. The computer of claim 23, further configured to execute computer-executable instructions for inserting probes in the probe locations that are not eliminated to collect the information relating to the execution of the application.

29. The computer system of claim 28, further configured to execute computer-executable instructions for analyzing the collected information.

30. A computer system comprising a processor that is arranged to execute computer-executable instructions including at least one tail merged portion, the computer-executable instructions comprising:
determining a set of probe locations in the application, wherein determining a set of probe locations includes:
identifying a probe location at a beginning of a calling function,
identifying a probe location at an end of the calling function,
identifying a probe location at a beginning of a first called function,
identifying a probe location at an end of the first called function,
identifying a probe location in the calling function at the beginning of a call to the first called function,
identifying a probe location in the calling function at the end of the call to the first called function,
identifying a probe location prior to a jump to a second function,
identifying a probe location after the jump to the second function, and
determining that the first called function is an internal called function,
eliminating the probe location in the calling function at the beginning of the call to the first called function;
eliminating the probe location at the end of the first called function and eliminating the probe location after the jump to the second function when the first called function includes the jump to the second function and when the second function includes a return to the calling function;
inserting probes in the identified locations that are not eliminated; and
collecting non-redundant information relating to the execution of the application using the inserted probes.

31. The computer system of claim 30, wherein a first probe is configured to collect an address of the first called function, a first stack pointer, and a first time indicator.

32. The computer system of claim 30, wherein a first probe is configured to collect an address of the calling function, an address of the first called function, a first stack pointer, and a first time indicator, and further wherein a second probe is configured to collect the address of the first called function, a second stack pointer, and a second time indicator.

33. The computer system of claim 30, further configured to execute computer-executable instructions for:
identifying a block of code to which execution of the application is directed upon occurrence of an error; and
inserting a first probe at a beginning of the identified block of code and a second probe at an end of the identified block of code,
wherein the first probe is configured to collect an address of the block of code, a first stack pointer, and a first time indicator, and the second probe is configured to collect the address of the block of code, a second stack pointer, and a second time indicator.

* * * * *